United States Patent [19]

Walley

[11] Patent Number: 4,475,692

[45] Date of Patent: Oct. 9, 1984

[54] SPREADER VEHICLE

[76] Inventor: Charles E. Walley, Cotton Abbotts, Waverton, Chester, England

[21] Appl. No.: 285,816

[22] Filed: Jul. 22, 1981

[30] Foreign Application Priority Data

Jul. 30, 1980 [GB] United Kingdom ............... 8024892
Jun. 26, 1981 [GB] United Kingdom ............... 8119805

[51] Int. Cl.³ .............................................. A01C 23/00
[52] U.S. Cl. .................................. 239/662; 239/675; 239/676; 239/679
[58] Field of Search ............... 239/662, 670, 672, 675, 239/676, 679, 681; 366/186

[56] References Cited

U.S. PATENT DOCUMENTS

| 3,420,452 | 1/1969 | Vaughan | 239/670 |
| 3,706,442 | 12/1972 | Peat | 366/186 |
| 3,797,807 | 3/1974 | Behrens | 366/186 |
| 4,185,782 | 1/1980 | Belrose | 239/662 |
| 4,362,272 | 12/1982 | Martin | 239/662 |

FOREIGN PATENT DOCUMENTS

| 975018 | 9/1975 | France | 239/670 |
| 420703 | 3/1967 | Switzerland | 239/676 |
| 773776 | 5/1957 | United Kingdom | 239/681 |
| 716530 | 2/1980 | U.S.S.R. | 239/675 |

Primary Examiner—Jeffrey V. Nase
Assistant Examiner—Forman: Michael J.
Attorney, Agent, or Firm—LeBlanc, Nolan, Shur & Nies

[57] ABSTRACT

A spreader vehicle, particularly for agricultural use in handling farmyard manure and slurry material ranging from free-flowing liquid to solid consistency, includes a body having one or more discharge openings in a lower part and conveniently to one side of the body, with a rotating impeller immediately outside the opening(s) for broadcast distribution of the material and a feed rotor, for example a large diameter auger, within the body and rotating in close proximity to its floor and at least the lower part of an opening for controlled feed of non-free flowing material through that opening. Preferably the impeller and the feed rotor are driven in the same direction of rotation about parallel horizontal axes so that the material is fed beneath both those axes, and the rate of passage of material through the opening(s) is regulated by a sliding door(s) or other closure means.

7 Claims, 8 Drawing Figures

SPREADER VEHICLE

DESCRIPTION

This invention relates to vehicles, particularly but not exclusively for agricultural use in the transport and broadcast distribution of materials, for example the spreading onto the land of all kinds of farmyard manure, slurry or the like; and/or the dispensing of silage, fodder, bedding or like materials to livestock, typically in the form of a trailed vehicle for use with a tractor, and vehicles fulfilling these and similar functions are referred to herein as "spreader vehicles".

Most known types of spreader vehicles are of limited application, i.e. they will either handle materials of liquid or semi-liquid consistency such as slurry or they will handle non-flowable to semi-solid materials such as farmyard manure or silage but not both, often necessitating the purchase of two or more separate machines. For example on a general stock rearing and dairy farm compacted farmyard manure from yards or sheds housing beef cattle may have to be handled as well as slurry from cow cubicles, pig houses etc. Even where the two types of machine are available there remains the problem of handling materials in what may be termed the "middle range" between semi-solid and free flowing liquid, particularly mixtures in that range which are of uneven consistency, for example slurry containing substantial bulks of semi-solids. The latter would choke most machines designed for slurry handling yet such mixture cannot be efficiently transported and spread by conventional manure spreaders due to leakage from the vehicle body during transport and/or inability of spreader mechanisms designed for semi-solid materials of substantially uniform consistency to clear liquids from the body and project them adequately in an even spreading pattern along with the more solid constituents of the load.

The range of consistencies of material needing to be handled may vary enormously even on a single farm depending on season of the year, methods of stock husbandary, and other factors. Thus at one extreme slurry may be a completely free flowing liquid containing little solid matter e.g. with a high urine content and/or adulterated by water used for washing down parlours etc (discharge to public drains and water courses is not usually permitted), while at the other extreme farmyard manure with a high dry straw or other litter content will be almost solid and have a low moisture content. In some cases manure is heavily sticky and of clay-like consistency which is particularly liable to clog mechanisms and/or to be spread unevenly and with difficulty or low efficiency. The moisture content and consistency of silage may also vary considerably and similar problems arise in transporting and distributing this to stock in an efficient yet palatable way.

The object of the present invention is to provide a spreader vehicle which is capable of efficient transport and spreading of a full range of materials and mixtures thereof, which is of simple and rugged construction, and convenient and reliable in use.

According to the invention there is provided a spreader vehicle including a body for containing a load of material, one or more discharge openings in the wall structure defining a lower region of the body, spreading means including rotary impeller means positioned to receive and act upon material passed from the or each opening, and feed means within the body operatively driven in conjunction with said impeller means and including an element or elements rotatable along a path of movement traversing an area or areas in close proximity to a floor surface of the body and at least a lower zone of said opening or openings so as to provide controlled feed of at least material of a non-free flowing nature from the bulk of the load over said floor surface and through the opening or openings in use.

One embodiment of the invention with certain alternative features is now described in greater detail by way of example and with reference to the accompanying diagrammatic drawings, in which.

Figure 1:
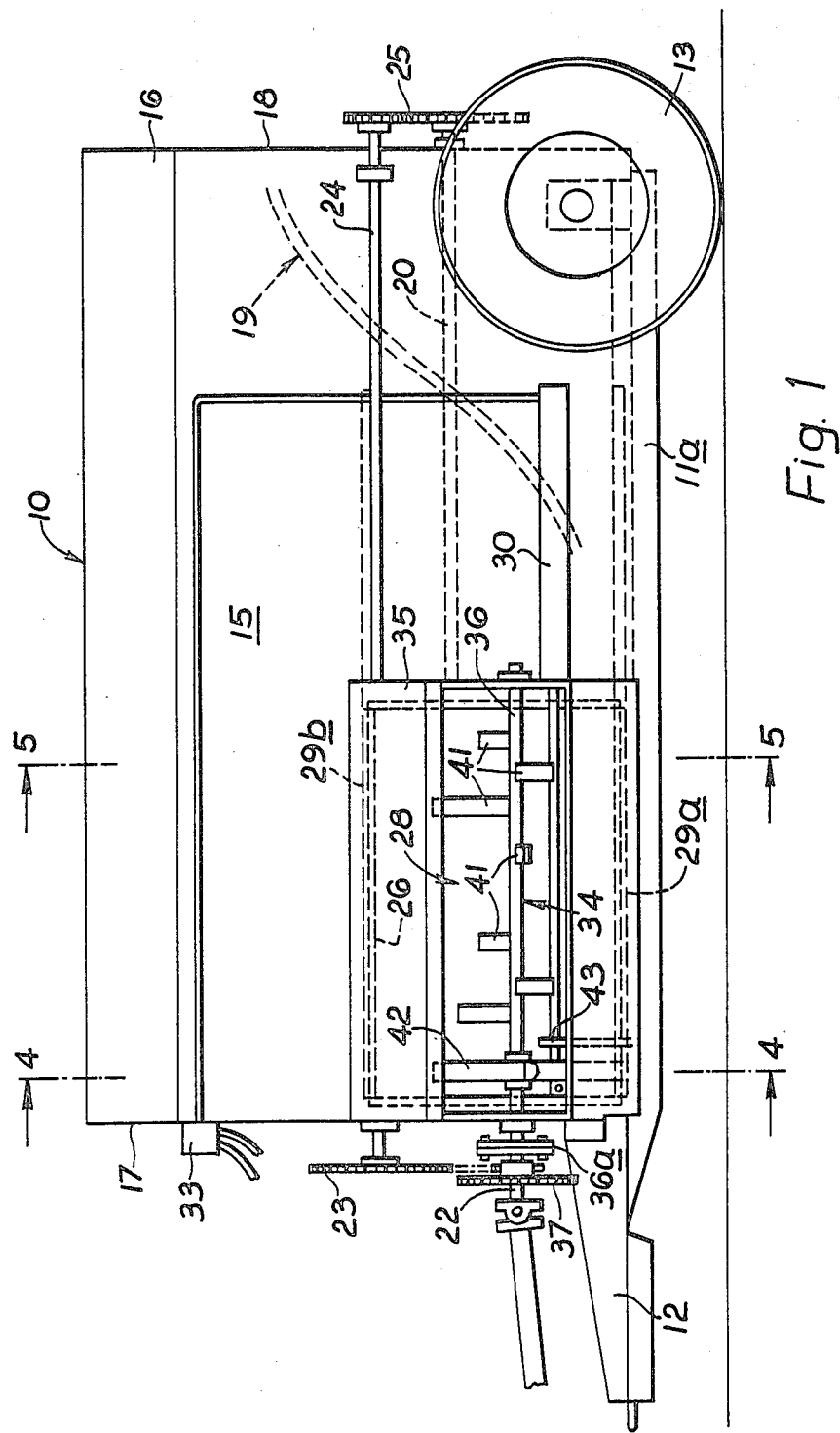
FIG. 1 is a side elevation of a spreader vehicle.

The vehicle shown in the drawings is a trailer spreader for use with an agricultural tractor and powered from the tractor PTO. It comprises an open topped container body 10 carried on a chassis 11 which extends forward to a drawbar 12 and has a pair of land wheels 13 at its rear end.

Body 10 is non-tipping and has a part-cylindrical floor 14 merging with planar side walls 15 which diverge upwardly to a rectangular top section 16, the front and rear walls 17, 18 being vertical.

In this example the body 10 is 3 m. (10 feet) long and floor 14 is radiussed at 0.48 m. (19 ins.).

A feed rotor 19 within the lower part of body 10 has a longitudinal shaft 20 journalled in end walls 17, 18 coaxial with floor 14. Rotor 19 includes a helical sweeper element 21 carried on spokes or other radial extensions from shaft 20 which extends generally longitudinally of body 10.

Sweeper element 21 forms a single start skeleton auger 0.91 m (3 ft) in diameter and having a pitch of some 0.91 m (3 ft) so as to give approximately 3⅓ turns from end to end of body 10.

Element 21 rotates in a path in close proximity (clearance about 2.54 cm) to the inner surface of floor 14 and the lowermost part of side walls 15. Rotor 19 is operatively driven from the PTO by a transmission including a PTO input shaft 22 journalled above drawbar 12, a first stage speed reduction consisting of sprocket and chain drive 23 to an intermediate shaft 24 extending along and outside the side of body 10 and a second speed reduction consisting of sprocket and chain drive 25 at the rear of the body. With a standard PTO output speed of 540 r.p.m. rotor 19 rotates at approx. 10 r.p.m.

Figure 4:
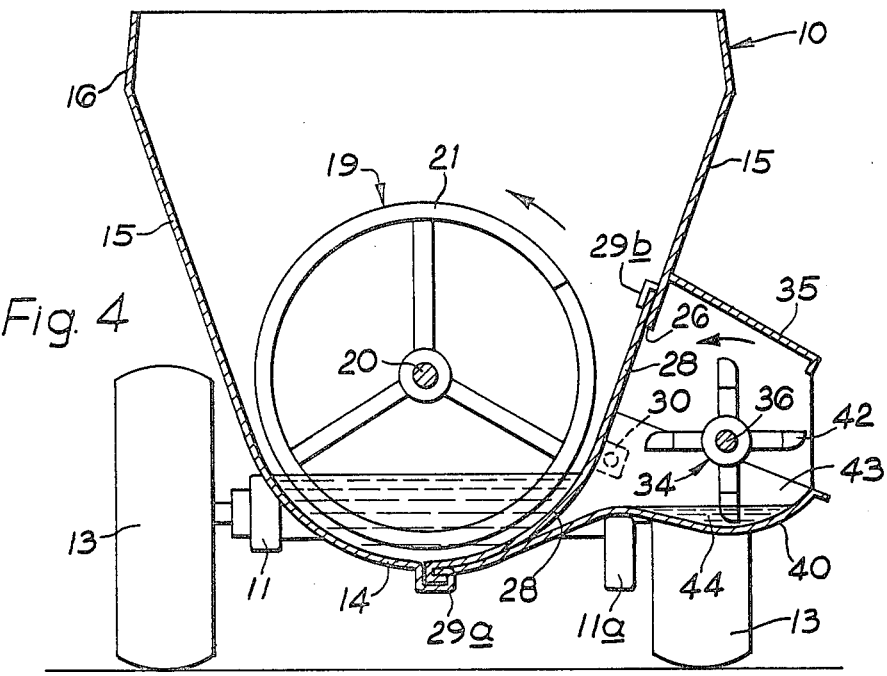
FIG. 4 is a lateral vertical section on line 4—4 of FIG. 1.
Figure 5:
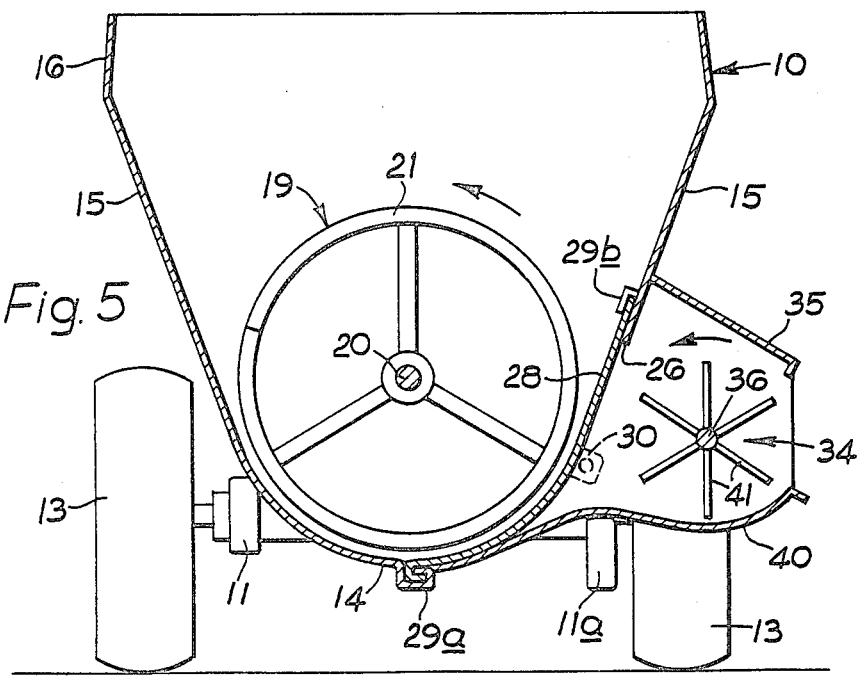
FIG. 5 is a lateral vertical section on line 5—5 of FIG. 1.

Rotor 19 will be driven anti-clockwise as viewed from the front of the body (FIGS. 4 and 5) so that sweeper element 21 is moving upwards on the left-hand side of the body as so viewed and said element is angled to give a forward component to movement of material within body 10 urging it in the direction of front wall 17.

Figure 6:
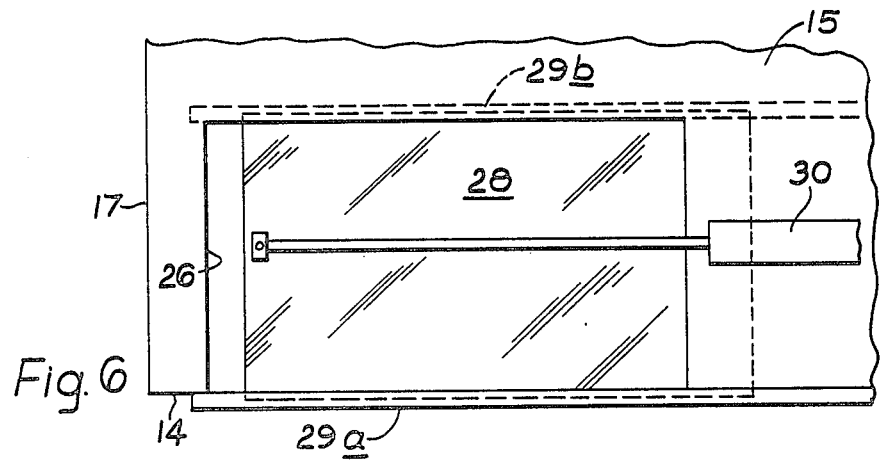
FIG. 6 is a detail of the discharge opening and closure means of FIG. 1.

On the left-hand side, forward of land wheel 13, a discharge opening 26 is provided (see FIG. 6) in the lowermost part of a front zone of side wall 15 so that it is closely swept on the inner side by upward passage of the sweeper element 21 of feed rotor 19.

Opening 26 is 1.3 m (4 ft) long, and is controlled by a closure member in the form of horizontally sliding door 28 opening in a rearward direction actuated by a hydraulic ram 30 mounted on the exterior of body 10 and connected by flexible hoses to the tractor hydraulics through an adjustable restrictor or other control valve unit 33. Door 28 extends vertically from the lowest area of floor 14 to a height of 0.61 m (2 ft) and its lower part is curved to correspond to the curvature of body 10. Its lower and upper edges run in channel section tracks 29 at the edges of opening 26 to form a substantially fluid tight seal, the door being within the body wall 15 so that the weight of material urges it into sealing engagement with opening 26. The upper track 29b projects slightly into body 10 as it is here clear of the cylinder of revolution of rotor 19 while the lower track 29a projects below the level of floor 14, the lower edge of door 28 being flanged outwardly to locate therein so that the lower inner face of the door is flush with floor 14.

A rotary spreader impeller 34 is mounted immediately outside opening 26 in a housing 35 projecting from the side of body 10. Impeller 34 is 0.66 m. (2 ft 2 ins) in overall diameter and has a horizontal shaft 36 extending along the side of body 10 driven from input shaft 22 by a chain and sprocket drive 37 in the same direction of rotation as rotor 19, i.e. anti-clockwise as viewed in FIGS. 4 and 5. A shear pin or slip clutch coupling 36a is provided at the input end of shaft 36 to protect the mechanism against damage if impeller 34 should be jammed. Alternative or additional protection against jamming may be provided by forming impeller 34 in one or more sections, each drive engaged with shaft 36 by a respective friction clutch. Impeller 34 is driven at a rotational speed 40 times greater than rotor 19, i.e. normally at about 400 r.p.m.

Housing 35 is open along its outer side and has a floor 40 on the general level of the lowest area of body floor 14. Floor 40 extends laterally from the lower edge of opening 26 below and in close proximity to the envelope of revolution of impeller 34. More specifically floor 40 rises in a very shallow hump to clear one of the chassis members 11a and then dips to form a shallow depression immediately below impeller 34.

Impeller 34 may take various forms, in this example it is provided with a series of randomly disposed rigid beater blades 41 along a major part of its length from its rearward end, and its front end, aligned laterally with the extreme forward portion of opening 26, carries four scoop or cup shaped paddles 42. A lateral partition 43 mounted on floor 40 defines a forward zone of the floor depression acting as a well 44 which will receive liquid from said forward portion of the opening to be acted on by the paddles 42.

The operation of the machine is as follows. If a load of semi-solid material of substantially uniform consistency, e.g. straw-based farmyard manure, is to be handled body 10 is loaded e.g. by using a front end loader and it is to be noted that the top of the body is open and unobstructed so facilitating this while opening 26 is closed. On reaching the site of spreading, discharge and spreading is effected by selective opening of door 28. The PTO drive is engaged so rotating both feed rotor 19 and impeller 34, the latter rotating at a much greater speed than the former. Element 21 of rotor 19 has an agitating or tumbling and separating action to divide the bulk of material and sweep it progressively round the lower body walls, as well as moving it gradually forwardly giving regular and controlled feed through the opening. The pitch of element 21, in this example 0.91 m is substantially less than the maximum effective aperture of opening 26 so that a part of element 21 is always co-acting with the opening to provide a more even feed of material therethrough.

The material passes out of body 10 to be acted on by the rapidly rotating impeller 34 which sweeps it across the floor 40 of housing below the impeller axis 35 and flings it clear of the body in a broadcast spreading pattern which, in practice, is found to give particularly speedy yet uniform distribution as the machine moves forward over an area having a width 4-5 times that of the machine. This process continues as the body is emptied, the residue of material at the bottom being swept round floor 14 by the feed rotor to pass through the opening so that the body is speedily and completely cleared. As the body empties door 28 can be progressively opened or it may be fully opened from the outset of spreading depending on the rate of spread required and the consistency and other properties of the material being handled at any time.

If slurry or other liquid material is to be handled opening 26 is closed and the body is filled using a slurry pump or like apparatus. On reaching the site of spreading door 28 is only slightly opened allowing controlled flow of the liquid into the front portion only of housing 35 where it flows mainly into well 44 to be acted upon by the paddles 42, again giving speedy and uniform spreading. Feed rotor 19 plays a lesser part in the operation though it will prevent clogging of the small effective opening by any more solid constituents of the load and at the final stages element 21 will sweep all but a small residue of the load to the opening for discharge. The horizontal movement of door 28 means that even at the smallest effective aperture the full height of opening 26 is available so that even if a lower part of the body is carrying a sediment of more solid material (and/or solids are floating on top of liquid as the level drops), liquid or semi-liquid will pass. If there is a solid residue the effective aperture can be increased in width to handle this at the appropriate stage.

The discharge and spreading operation can be controlled to suit materials having properties between the two extremes by selection and adjustment of the degree of opening of door 28 as spreading proceeds.

An indicator flag or pointer connected to door 28 or its actuating ram may be provided in a position readily visible to the tractor driver to indicate the extent of door opening.

As stated above, if both liquid and semi-solid materials are being handled at the same time, particularly where they are a non-uniform mixture, no particular problem arises. Clogging or blockage when door 28 is only slightly opened is prevented by the action of feed rotor 19 which at the same time meters the passage of the semi-solids through the opening to prevent irregular discharge which would cause an uneven spreading pattern. The rotor also has a mixing action which evens out the consistency of the load as spreading proceeds.

Rotation of both rotor 19 and impeller 34 in the same direction means that the material is passed below the axes of both as it exits from body 10 and is acted on to be flung clear of the spreader. This avoids any tendency for material to be thrown back into the body through the upper part of opening 26 by the action of impeller 34 as would be the case if it rotated in the opposite way. Also as the material is ejected from the floor of housing 35, it is flung initially upwardly and outwardly giving a better spread trajectory and increasing efficiency and speed of operation. Thirdly this arrangement avoids the complication of having to provide for reverse drive by the use of gear boxes or the like.

Any small leakage or seepage from door 28 while it is closed during transport will be caught by housing floor 40 so that yards and roads are not fouled or made dangerous.

The feed rotor within the body may take various forms. One or more opposite handed or uniformly handed auger bars or vanes may be employed and/or longitudinally extending scraper blades or bars, randomly arranged blades or the like and some or all of these may be resiliently mounted to urge them towards or into contact with the body walls and/or for better protection against damage or jamming. A short portion of the feed element 21 may consist of an opposite handed auger bar to clear any undue accumulation of material rearwardly from front wall 17 towards the opening(s).

Similarly the spreader impeller may take various forms, it may be provided with rigid blades, and/or hinged flails, chains or other beater or propelling elements and/or a plurality of rotatable or other impellers, spinner discs or the like may be employed.

The power needed to operate the machine is low throughout the spreading cycle with all types of material and discharge of a full load is achieved with effective and even spreading within a few minutes. The range of broadcast spreading with the machine described is some 15.25 m (50 ft). The drive mechanism is sturdy and simple, no gears or special controls are needed and the machine requires a minimum of maintenance and servicing.

Figure 7:
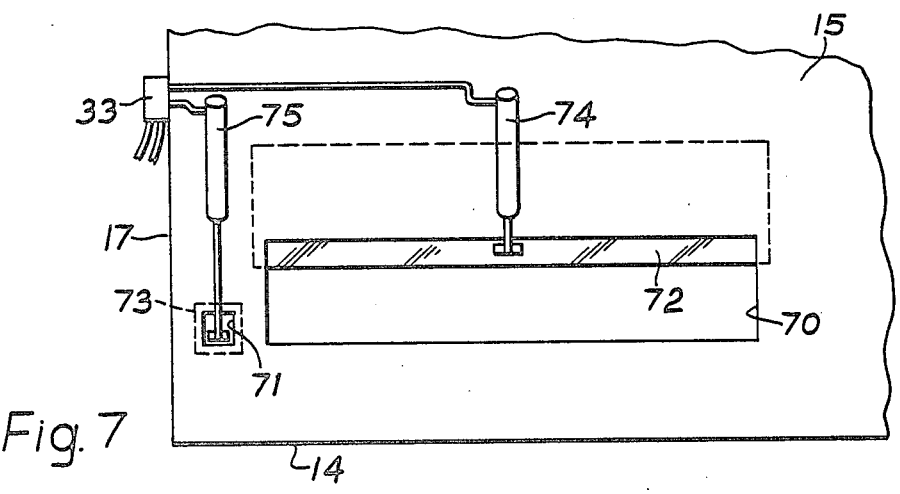
FIG. 7 is a diagram of one alternative arrangement of discharge openings and closure means.

FIG. 7 illustrates an alternative arrangement of discharge openings and closure means. There are two openings, a major one 70 and a separate minor one 71 spaced a short distance forwards of opening 70 and with its lower edge generally on a level with the lower edge of opening 70. Opening 71 is 150 mm square and will be opposite the paddles 42 of impeller 34 (not shown). The major opening 70 corresponds to the major portion of impeller 34 carrying the beater blades 41. Each opening 70, 71 is controlled by a respective closure member in the form of an independently actuated vertically sliding door 72, 73 operated by respective hydraulic rams 74, 75 mounted above the openings. For liquid discharge and spreading minor opening 71 only is operated to allow flow to the paddles 42, with controlled successive opening of door 72 for discharge of solids or semi-solids. If the load is substantially solid (i.e. non flowable) material both doors can be opened together (the small opening 71 will play little or no part in discharge of such material).

The control valves 33 of rams 74 and 75 may include a restrictor which can be preset for automatically raising door 73 in advance of door 72 to provide the emptying sequence described above for the mixture of liquid and semi-solid materials.

Figure 8:
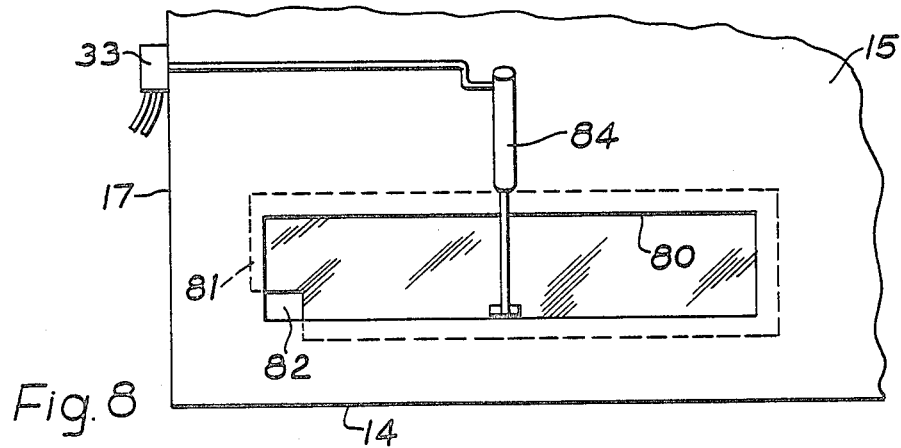
FIG. 8 is a diagram of another alternative discharge opening arrangement.

In the case of a vertically opening door arrangement the same effect as referred to in connection with the two doors 72, 73 may be achieved by use of a single appropriately shaped opening and/or closure door for example as shown in FIG. 8. Here a single oblong opening 80 is provided with a door 81 sliding vertically actuated by a ram 84 and having a cut-out 82 at one lower corner. When fully closed door 81 has a substantial overlap at its bottom edge including cut-out 82 so that opening 80 is completely sealed but raising the door by a small amount will provide a controlled minor opening in the area of cut-out 82 for liquid discharge in the manner described above, the door being fully raised for discharge of semi-solid materials etc. A similar shaping might be applied to a horizontally opening door. It is contemplated that other arrangements of openings, for example multiple openings along the length of the body, and/or openings on both sides if discharge to either or both sides should be required, might be employed.

The total length of the discharge openings shown in FIGS. 7 and 8 may be greater than that of opening 26 previously described, for example some 2.20 m long i.e. over ⅔ the length of a 3 m long body instead of 1.3 m long (less than half the body length). The shorter opening is preferred as enabling a shorter impeller to be used which is cheaper and stronger and also has less momentum when rotating so that it is less susceptible to damage from obstruction or foreign bodies.

The preferred absence of any substantial ledge or sill between the lowest part of the body floor and the floor of housing 35 greatly facilitates speedy full clearance of the body with materials of all types.

The invention might also be applied to arrangements incorporating discharge from the rear of the vehicle body in some applications though this is generally not so desirable as spreading then takes place substantially along the direction of travel of the vehicle and the width of the spread path cannot readily be much greater than that of the vehicle itself with the preferred form of impeller described above, also the operation is not readily visible to the driver.

Figure 2:
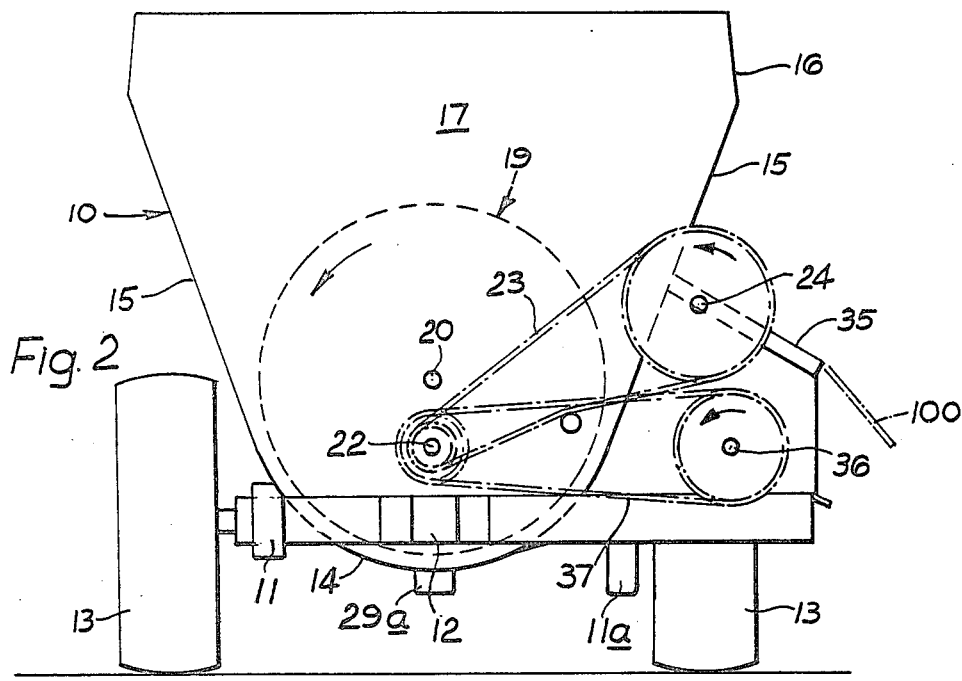
FIG. 2 is a front end elevation.
Figure 3:
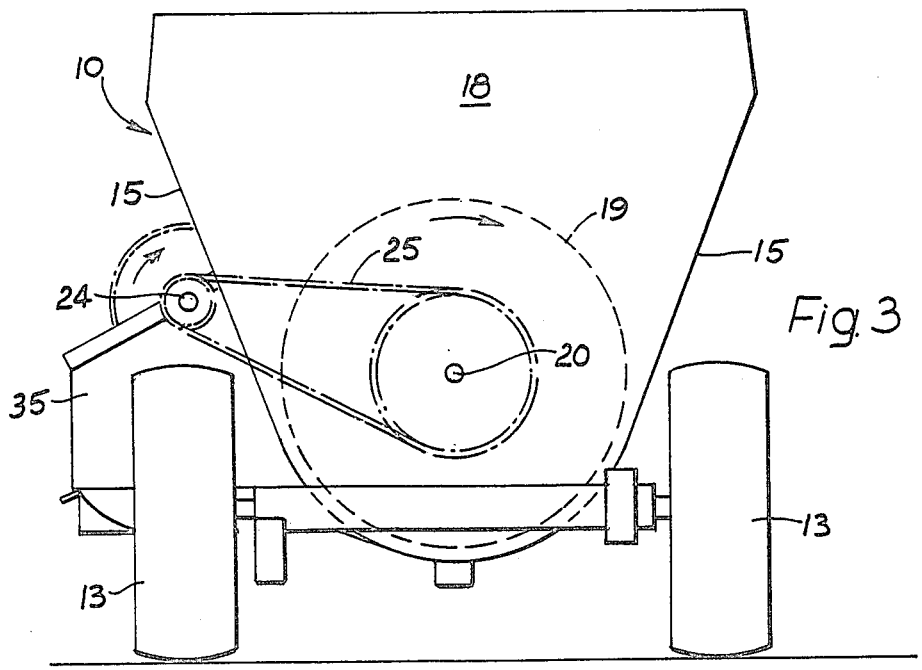
FIG. 3 is a rear end elevation.

The forms of vehicle described are also effective for breaking up, mixing or assisting in the mixing of, and distributing other materials, particularly handling and distributing silage to stock housed in yards or pens. Loading and operation is as described above for farmyard manure or other semi-solid materials but a control shutter, indicated in broken lines at 100 on FIG. 2 is positioned to direct the discharge from housing 35 generally downwards so that the shredded and separated silage can be distributed along a feed fence or trough as the vehicle is driven forward.

Having now described my invention what I claim is:
1. A spreader vehicle including:
   a body for containing and transporting a bulk load of material of a consistency which may range from liquid to non-flowable semi-solid, said body having wall structure provided with discharge opening means in a lower region for controlled passage of material from the body;
   closure means selectively displaceable to determine a variable effective open area of the discharge opening means through which area the material may pass from the body during spreading, and to completely close said discharge opening means for containment of the material within the body during transport;
   feed means including a feed element extending longitudinally of said lower region of the body and operatively rotatably driven about a first horizontal axis, formations of the feed means being shaped to progressively sweep material across a part of a floor of the body extending below said axis and laterally adjacent the discharge opening means towards and through said open area during spreading and at the same time progressively shift material from said bulk along other parts of the floor surface of the body towards the discharge opening means; and spreading means including impeller means driven for rotation about a second horizontal axis parallel to the first axis outside and in proximity to said opening means, and in the same direction of rotation as said feed element to receive and act on material passed through said opening means; characterized by (a) said wall structure of the body including front and rear end walls each extending continuously to the full effective height of the body and between which the whole effective length of the feed means is located;

(b) the discharge opening means being defined by a lower side wall of the body forward of the rear end wall; and (c) a housing having an opening along its outer side, said housing extending laterally of the body from the exterior of the discharge opening means to enclose the ends of the spreading means and having a floor extending below the spreading means whereby the material passed through the discharge opening means is carried below the second axis and discharged laterally of the body forward of said rear end wall and wholly to one side of the path of travel of the vehicle in use.

2. A vehicle as in claim 1 wherein the discharge opening means to a low part of the floor of the body and the floor of the housing extends on the general level of the bottom of a lower edge of the discharge opening means.

3. A vehicle as in claim 2 wherein said housing floor includes a depression immediately below said impeller means in which liquid material will collect to be acted on by the impeller means in use.

4. A vehicle as in claim 3 including a partition defining a zone of the housing floor which will receive liquid material passing from a small effective open area of the discharge opening means and the impeller means includes paddle elements acting in said zone for spreading liquid material therefrom in use.

5. A vehicle as in claim 1 in which the discharge opening means is a rectangular discharge opening and the closure means is a horizontally sliding door, the effective open area at minimum displacement of the door from a fully closed position being the full height of said rectangular discharge opening but only a minor portion of the width thereof.

6. A vehicle as in claim 1 wherein the discharge opening means is a rectangular discharge opening and the closure means is a vertically sliding door having a cutaway in a lower edge portion to provide an effective open area at minimum displacement of the door from a fully closed position which extends horizontally along only a minor portion of the width of said opening and upwardly along only a minor portion of the height thereof from a lower edge of said opening.

7. A vehicle as in claim 1 wherein the discharge opening means comprises a major discharge opening through which a substantial volume of material can pass and a separate minor discharge opening through which liquid or free flowing material can pass, and the closure means comprises a door respective to and co-acting with each said opening.

* * * * *